US008019376B2

(12) United States Patent
Remy et al.

(10) Patent No.: US 8,019,376 B2
(45) Date of Patent: Sep. 13, 2011

(54) METHOD AND SYSTEM FOR LOOP DATA DISTRIBUTION GENERAL FIELD OF INVENTION AND STATE OF THE ART

(75) Inventors: Christophe Remy, Paris (FR); Pierre Remy, Paris (FR); Maurice Remy, Paris (FR)

(73) Assignee: Auteuil Participation et Conseil, Paris (FR)

( * ) Notice: Subject to any disclaimer, the term of this patent is extended or adjusted under 35 U.S.C. 154(b) by 2302 days.

(21) Appl. No.: 10/181,907

(22) PCT Filed: Jan. 19, 2001

(86) PCT No.: PCT/FR01/00176
§ 371 (c)(1),
(2), (4) Date: Jul. 19, 2002

(87) PCT Pub. No.: WO01/54349
PCT Pub. Date: Jul. 26, 2001

(65) Prior Publication Data
US 2003/0083007 A1 May 1, 2003

(30) Foreign Application Priority Data
Jan. 20, 2000 (FR) .................................. 00 00683

(51) Int. Cl.
*H04M 1/00* (2006.01)
*G06F 13/00* (2006.01)
*G06F 7/38* (2006.01)

(52) U.S. Cl. ...................... 455/550.1; 711/132; 712/239
(58) Field of Classification Search .................. 370/386, 370/395.52, 475, 258; 711/132, 112; 715/767; 257/686; 364/490, 200; 712/213, 200; 455/3.01, 455/434, 414.1, 550.13; 716/17, 123, 124; 718/100
See application file for complete search history.

(56) References Cited

U.S. PATENT DOCUMENTS

| | | | | |
|---|---|---|---|---|
| 4,965,716 A * | 10/1990 | Sweeney | ....................... | 710/112 |
| 5,524,001 A | 6/1996 | Beaudry et al. | | |
| 5,537,332 A * | 7/1996 | Bolliger et al. | .................. | 716/17 |
| 5,842,010 A * | 11/1998 | Jain et al. | .................... | 348/14.02 |
| 5,893,148 A * | 4/1999 | Genduso et al. | ............. | 711/132 |
| 6,115,041 A * | 9/2000 | Dang et al. | .................... | 715/767 |
| 6,683,372 B1 * | 1/2004 | Wong et al. | .................... | 257/686 |
| 6,785,272 B1 * | 8/2004 | Sugihara | ....................... | 370/386 |

* cited by examiner

*Primary Examiner* — Kiet Doan
(74) *Attorney, Agent, or Firm* — Blakely, Sokoloff, Taylor & Zafman

(57) ABSTRACT

A method for loop distribution of a plurality of data blocks corresponding to objects fragments, or aggregates of objects such as alphanumeric messages, screen pages, graphic objects integrated in pages, and/or sound sequences designed to be restored by restoring means. Data blocks are distributed by stacking them into several stacks corresponding to different distribution priorities. This operation is repeated by sampling outputs of each stack based on the distribution priority of the stacks.

11 Claims, 3 Drawing Sheets

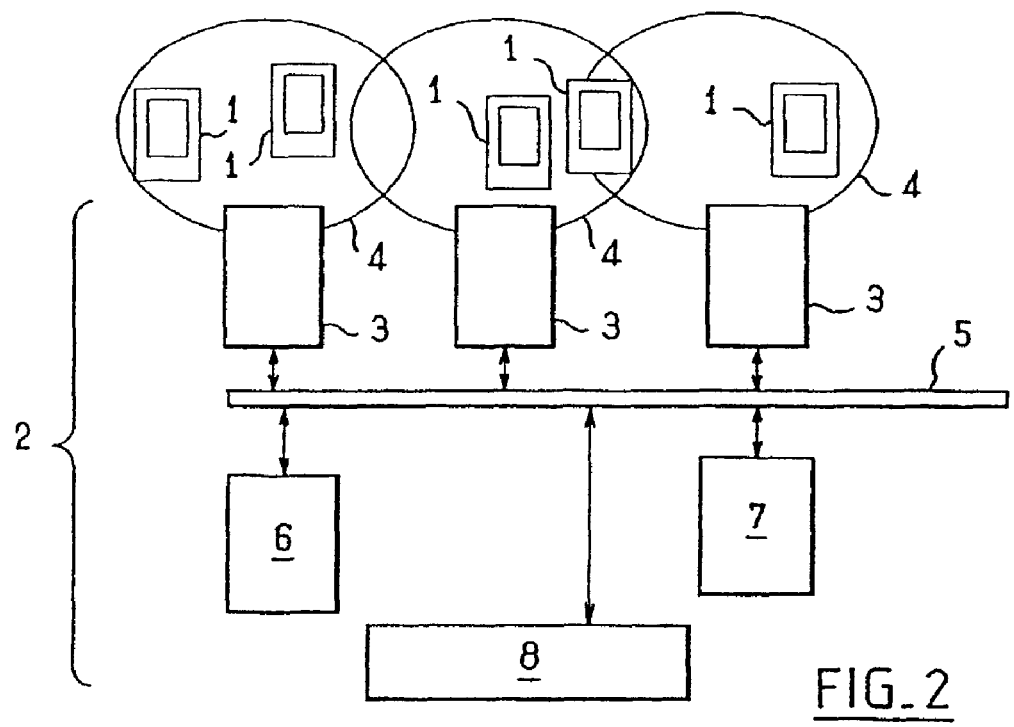
FIG_2
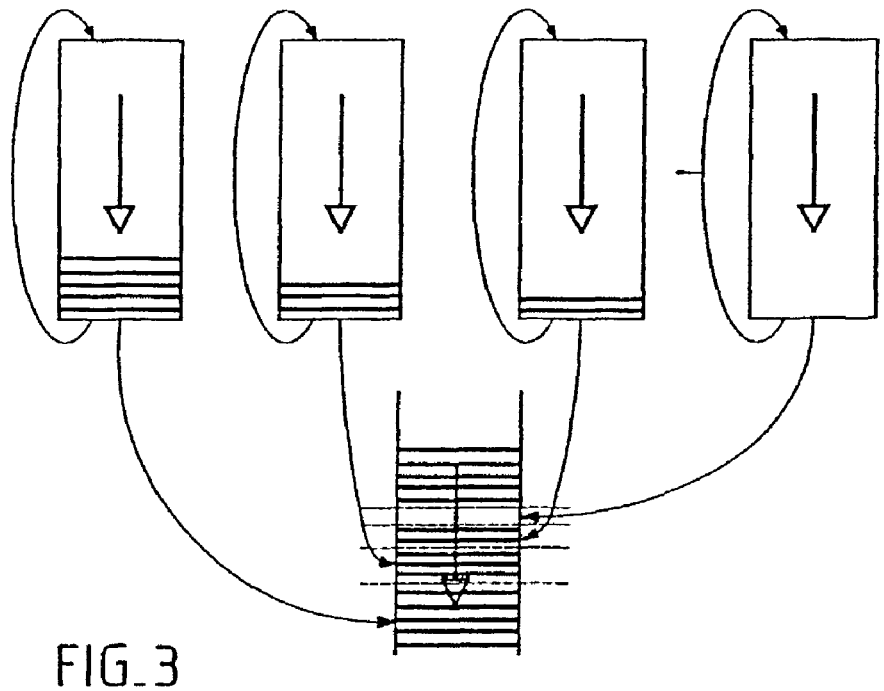
FIG_3

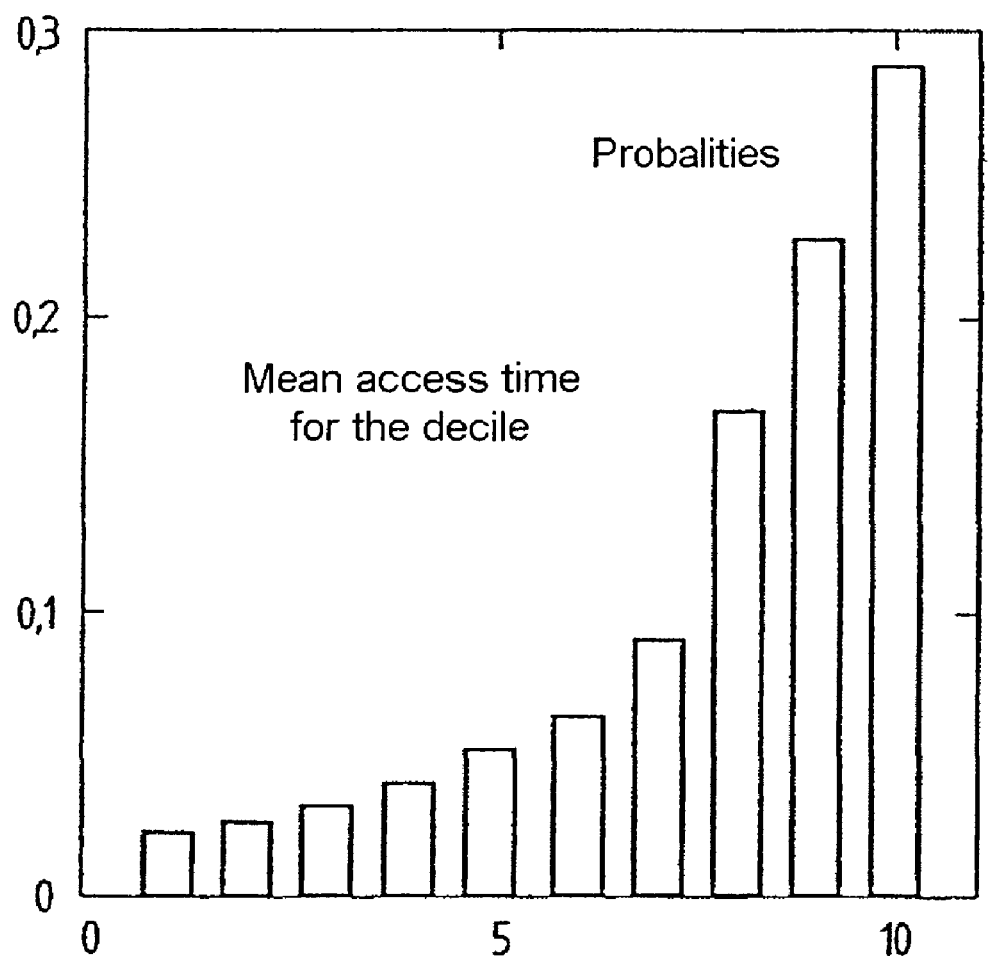
FIG_4

METHOD AND SYSTEM FOR LOOP DATA DISTRIBUTION GENERAL FIELD OF INVENTION AND STATE OF THE ART

This is a non-provisional application claiming the benefit of International application number PCT/FR01/00176 filed Jan. 19, 2001.

The present invention relates to loop data broadcasting.

More especially, the invention advantageously finds application in respect of the radio broadcasting of data in a loop intended for a plurality of portable terminals with which users located in a given area are equipped.

Loop data transmission is conventionally known and has in particular been used in France in teletext systems.

A problem generally encountered with loop data broadcasting is that of the access time.

A user, in order to obtain access to a particular page, must in fact wait for the part of the file corresponding to what he is searching for to turn up and be acquired by his receiver.

Procedures which aim to minimize this access time have already been proposed.

In particular, U.S. Pat. No. 5,842,010 proposes a procedure for the loop transmission of data—which are intended to be displayed on screens of portable receiver terminals—according to which said data are broadcast in an order which is determined as a function of a statistical analysis of the needs of the users. The statistical analysis can be carried out on the basis of requests for information returned by the users to the system which broadcasts the data.

However, this procedure is not optimal and is actually of interest only insofar as each user is systematically compelled, by the data broadcasting system used, to apprise himself of the data broadcast from one and the same first screen page broadcast in the data loop.

Moreover, it is also known, in particular in respect of the aforesaid teletext systems, to repeat within the broadcasting loop those of the data blocks which are most frequently consulted.

It will however be noted that in teletext systems, the broadcasting loop is generally frozen and experiences no alteration over time.

PRESENTATION OF THE INVENTION

The invention proposes for its part a loop data broadcasting method with which the access times of the users are further improved.

For this purpose, the invention relates to a method for the loop broadcasting of a plurality of data blocks which correspond to objects or to fragments or aggregates of objects such as alphanumeric messages and/or screen pages and/or graphical objects integrated into screen pages and/or sound sequences, and intended to be restored by restoring means with which users are provided, characterized in that the data blocks are distributed by stacking them into several stacks corresponding to different broadcasting priorities and in that the operation consisting in sampling at the output of each stack a number of data blocks which is dependent on the priority of broadcasting of said stack and in broadcasting the data blocks thus sampled is repeated, the data blocks sampled at the output of each stack being, at each iteration, restacked at the input thereof.

Such a method is advantageously supplemented with the following various characteristics taken alone or according to all their technically possible combinations:

information regarding the interest shown by the users in the various objects broadcast is received in real time and the numbers of data blocks sampled from a stack are modified and/or a change of data block stack is effected as a function of this information;

the number of stacks is 3 or 4;

the data blocks broadcast have a size of less than 400 useful bytes;

the data blocks to be broadcast are classed in order of priority of consultation, the list thus constructed is divided into K stacks with a number of substantially equal data blocks and the data blocks of each stack are broadcast with a frequency equal to or nearly equal to $$f_j = \frac{B}{t} \frac{\sqrt{\pi_j}}{\sum_{j=1}^{K} \sqrt{\pi_j}}$$

where j denotes the index of the stack, B the broadcasting capacity, t the size of the stacks and where $$\pi_j = \sum_{i=1}^{M} p_i$$

$p_1$ being the probability of consultation of an object described wholly or partly by the data block i, M being the number of data blocks in a stack;

the numbers $a_j$ of data blocks sampled at each iteration are such that they minimize $$\varepsilon = \left(\sum_j a_j\right) \cdot \sum_j \frac{\pi_j}{a_j} - \left(\sum_j \sqrt{\pi_j}\right)^2$$

the number M of data blocks in each stack is chosen to be a multiple of each of the numbers $a_j$;

at least one padding data block is introduced into at least one stack;

the number $a_j$ is chosen less than or equal to 9;

objects common to several screens are transmitted once only;

these objects are transmitted with a home page data block.

The invention also proposes a system for loop data broadcasting comprising means for the radio broadcasting of data blocks within a given area, a plurality of portable terminals able to receive the data blocks thus radio broadcast, processing means which manage the broadcasting of said data, characterized in that said processing means implement a method of the aforesaid type.

PRESENTATION OF THE FIGURES

Other characteristics and advantages of the invention will become further apparent from the description which follows. This description is purely illustrative and nonlimiting. It should be read in conjunction with the plates of drawings appended in which:

FIG. 2 illustrates a possible architecture for this embodiment;

FIG. 3 illustrates a mechanism for optimizing the broadcasting of the information;

FIG. 4 is a graph on which has been plotted an exemplary distribution of probabilities for a certain number of objects to be broadcast.

DESCRIPTION OF AN EMBODIMENT AND MODE OF IMPLEMENTATION

General Architecture

Figure 1:
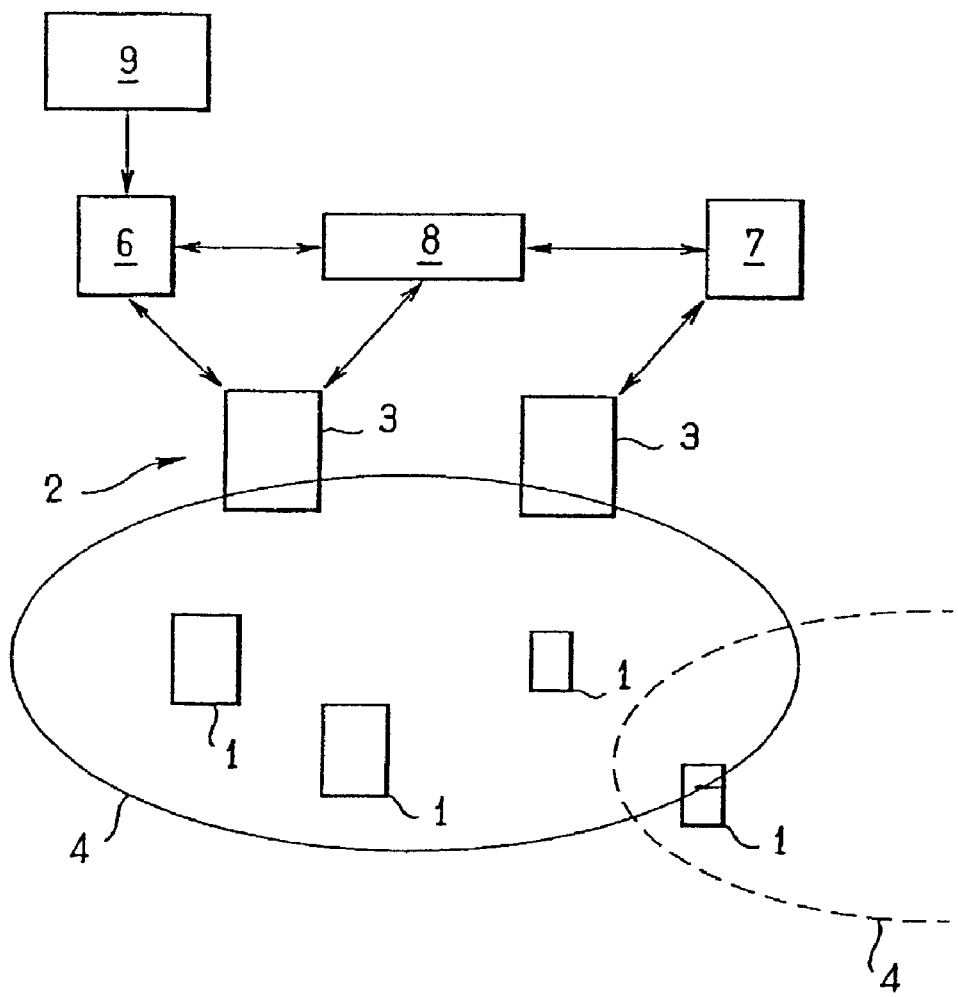
FIG. 1 is a diagrammatic representation of a system in accordance with one possible embodiment of the invention.

The system which is represented in FIG. 1 comprises a plurality of receiver terminals 1 and an infrastructure 2 for the radio broadcasting of loop data intended for these terminals 1.

These terminals 1 are for example pocket computers such as those marketed by the company 3COM under the designation "Palm" or such as those using the Windows CE operating system and marketed by the companies CASIO and COMPAQ under the respective designations "Cassiopeia" and "Aero".

They are furnished with means enabling them to receive the data radio broadcast in a loop by the infrastructure 2 and to transmit data intended for this infrastructure.

These means comprise in particular an antenna for the reception of radio signals, a modem corresponding to the 802.11 standard and software tailored to the system and whose functionalities will be understood on reading what follows.

The infrastructure 2 comprises a plurality of broadcasting posts 3 which together define, in an area in which one wishes the services offered by the system to be accessible, one or more coverage cells 4 which may partially overlap.

The various broadcasting posts 3 are interlinked by a wire network 5 (FIG. 2) of Ethernet type and are equipped with means of radiofrequency broadcasting, which process the information received from the network by said posts so as to broadcast it according to the aforesaid 802.11 standard.

The data intended to be broadcast in a loop are in particular transmitted to said posts 3 by way of one or more broadcasting servers 6, connected to the network 5, which transmit on the latter in "multicast" mode the data intended to be broadcast.

The system furthermore comprises one or more transactional servers 7 which send and receive, by way of the network 5, data in "unicast" mode which correspond to transactions between the terminals 1 and the system, the posts 3 comprising means enabling them to receive data radio broadcast by the terminals 1 and to resend them on the network 5.

Moreover, the system also comprises an administration server 8—also connected to the network 5—which supervises the operation of the various posts 3 and of the servers 6 and 7 and configures them.

If a dynamic IP mode of addressing is adopted, the system can also comprise a complementary addressing server.

Presentation of the Processing Implemented by the Broadcasting Server

The broadcasting process implemented by the broadcasting server or servers 6 consists of the periodic sending, by the posts 3 to the receiver terminals 1, of data blocks, which correspond to objects which have to be restored at the level of the terminals 1 and which are for example alphanumeric messages and/or screen pages and/or graphical objects integrated into screen pages and/or sound sequences.

The data blocks broadcast have a maximum size of 400 useful bytes, thereby limiting the risks of transmission errors.

A fragmentation/defragmentation process may if appropriate be implemented for the transmission of objects whose description requires a higher number of bytes.

The succession of data blocks broadcast is updated in real time under the guidance of the broadcasting server 6 by taking into account a statistic which is for example a statistic regarding the frequency of consultation of the various screen pages by the users, the objective of this guidance being to make it possible to supply users as quickly as possible with the alphanumeric messages, screen pages, sound sequences, etc., which are liable to interest them.

This statistic is compiled on the basis of consultation reports which are transmitted periodically by the terminal to the broadcasting servers by way of the posts 3. These reports which give the list of screens consulted by the user of the terminal since the last report was dispatched allow the broadcasting servers to ascertain in real time the consultation statistic for the screens.

Each portable terminal 1 stores and updates the various data blocks as and when it receives them. It places its radio modem on standby as soon as all the data blocks have been correctly received and stored.

The broadcasting server 6 receives, from editing stations 9 (FIG. 1), to which it is for example linked by the network 5, a series of data blocks (files) describing the objects to be broadcast, as well as an edit and presets file.

The server 6 distributes these data blocks to be broadcast according to several stacks which each correspond to a different priority class.

To each of these priority classes there corresponds a nominal broadcasting frequency.

Initialization values—which are for example functions of earlier statistics—are allocated by the administrator of the service to these broadcasting frequencies, then these broadcasting frequencies are managed dynamically on the basis of the consultation reports transmitted by the terminals, if the dynamic mode has been selected.

After having distributed the data blocks by classes, the server proceeds, within each class, to the aggregating of the blocks whose size is less than 80% of the maximum size so as to reduce the relative weights of the UDP/IP or TCP/IP header in the transmission. This aggregation consists in encapsulating two or more objects into one and the same data block (same UDP frame). It does not apply to the control and management messages which are broadcast with the data blocks, for example in the form of a prefix at the start of each frame dispatched.

Thus, in each of the stacks which correspond to the various priority classes is stored a succession of data blocks, each of these blocks corresponding to objects or to fragments or aggregates of objects. The various data blocks of one and the same stack are broadcast at the frequency of the priority class to which said stack corresponds.

To construct the broadcasting stack which is regularly emptied intended for the broadcasting posts 3, the server 6 samples successively from each class a certain number of data blocks. This operation is repeated continuously.

The sampling number for a class is different from one class to another; the higher the priority of the class, the higher this number.

FIG. 3 summarizes this mechanism. In the example chosen, the numbers of data blocks chosen at each loop are the following:

| Class 0 | Class 1 | Class 2 | Class 3 |
| --- | --- | --- | --- |
| 5 | 3 | 2 | 1 |

As was indicated previously, upon initialization of the system, the target broadcasting frequencies of the classes are fixed by the administrator, according to a predefined model which takes account for example of earlier statistics.

As and when the consultation reports arrive at the server, the latter can, if the dynamic mode has been selected:

change the class of certain objects or data blocks if their frequency of consultation deviates overly from that of the other data blocks making up the class in question, modify the frequency of broadcasting of the classes so as to optimize the access time.

These modifications are carried out after filtering making it possible to ensure that the movements in the consultation frequencies are indeed a lasting phenomenon and not a statistical quirk.

A detailed example of a possible optimization processing will now be described.

Detailed Example of Optimization Processing

Principle

The sampling numbers for the various priority classes are obtained by searching for the solution in whole numbers yielding frequencies of broadcasting of the messages which are closest to the theoretical values optimizing the mean access time.

More precisely, the optimization implemented by the system proposed by the invention consists in broadcasting each data block i with a frequency which is as close as possible to a theoretical frequency $f_i$ which satisfies:

$$f_i = \frac{B}{\sum_{i=1}^{N} \sqrt{p_i t_i}} \sqrt{\frac{p_i}{t_i}}$$

where N is the number of messages of the service $t_1$, the size of the data block in KØ, $p_1$ the probability of consultation of an object described wholly or partly by data block i, and where B is the capacity in KØ/s of the channel portion assigned to broadcasting (CFP).

It can in fact be proven that this probability $f_i$ makes it possible to optimize the mean access time over all the screens under the constraint of remaining within the broadcasting capacity available on the network.

The optimized mean access time is then $$T_{opi} = \frac{1}{2B} \left( \sum_{i=1}^{N} \sqrt{p_i t_i} \right)^2$$

With a typical distribution of consultation probabilities such as that of the graph of FIG. 4 (distribution of probabilities per decile), a mean size of the data describing the screens of 15 KØ, the improvement in the mean access time relative to uniform broadcasting is around 25%, this improvement reaching 60% for the first decile of the most consulted screens.

The price to be paid when this optimization strategy is used alone is an increase in the access time for the least consulted screens.

The following table summarizes the results of simulations for a service with 100 screens and for a network bit rate of 100 KØ/s.

| | Mean time without optimization | Optimized mean time | Mean time first decile | Mean time last decile |
| --- | --- | --- | --- | --- |
| Seconds | 7.22 | 5.62 | 2.87 | 16.67 |
| Ratio to mean time without optimization | 1 | 0.78 | 0.40 | 2.31 |

Practical Implementation

Construction of the Stacks

In practice, the data blocks to be broadcast are ranked into classes in order of priority of consultation.

The list thus ranked is then divided into K equal stacks (or stacks whose sizes are as similar as possible). Thus, if N is the number of data blocks to be broadcast, E the integer part function, the first E(N/K) blocks of the list are grouped into a first stack, then the next E(N/K) blocks are grouped into a second stack, etc.

All the blocks of one and the same stack thus constructed are then broadcast with a frequency of repetition which is as similar as possible to the theoretical frequency corresponding to the mean consultation probability of the objects of the stack.

For stack j, this probability corresponds to the probability of consultation of any block, i.e.:

$$\pi_j = \sum_{i=1}^{M} p_i$$

where $p_i$ is the probability of consultation of the i-th block of the stack and where M is the number of blocks in a stack.

The theoretical frequency of broadcasting which one wishes to approximate for stack j is:

$$f_j = \frac{B}{t} \frac{\sqrt{\pi_j}}{\sum_{j=1}^{K} \sqrt{\pi_j}}$$

where t is the size (in KØ) of each of the stacks.

The mean consultation time for a block of the broadcasting loop is then given by:

$$T_s = \frac{1}{2B} \left( \sum_{j=1}^{K} \sqrt{\pi_j t} \right)^2 = \frac{t}{2B} \left( \sum_{j=1}^{K} \sqrt{\pi_j} \right)^2$$

the time $T_s$ being an approximation of the time $T_{opt}$ given above.

The table below indicates the optimization discrepancies relative to the mean time for the example given above (values obtained by simulation and referred to the mean time without optimization).

|  | Mean time without optimization | Optimized mean time | Mean time first stack | Mean time last stack |
| --- | --- | --- | --- | --- |
| Theoretical frequency | 1 | 0.72 | 0.40 (1 decile) | 241 (last decile) |
| 10 stacks | 1 | 0.78 | 0.50 | 1.85 |
| 5 stacks | 1 | 0.81 | 0.54 | 1.89 |
| 4 stacks | 1 | 0.82 | 0.57 | 1.93 |
| 3 stacks | 1 | 0.82 | 0.61 | 1.99 |

This table shows that the reduction in performance due to the limited number of stacks remains very modest compared with the simplification permitted in the broadcasting server whose number of stacks can be limited to three or four.

Moreover, this distribution into stacks limits the excessive access times in respect of the least consulted objects or screens which will have the access times for the last stack.

Implementation of the Iterations

At each iteration, the server samples $a_1$ data blocks from stack 1, $a_2$ data blocks from stack 2, ..., $a_j$ data blocks from stack j, ..., $a_k$ data blocks from stack K.

It can be proven that the optimal solution would be obtained with:

$$\forall j \frac{a_j}{\sum_j a_j} = \frac{\sqrt{\pi_j}}{\sum_j \sqrt{\pi_j}}$$

an equation which in general has no exact solution in whole numbers.

However, numbers $a_j$ which are not too large are chosen so as:
- not to overly disperse the data blocks which may correspond to one and the same object (screen for example);
- to allow the creation of a broadcasting script of an acceptable length without excessive padding (see later).

In practice, the number of data blocks sampled at each cycle from the most consulted stack will be limited to nine.

To arrive at an approximate solution, a table of possible values of K-tuples giving approximate values of the probabilities $\pi_j$ and minimizing the discrepancy between the mean access time actually obtained:

$$T_R = \frac{t}{2B} \cdot \left(\sum_j a_j\right) \cdot \sum_j \frac{\pi_j}{a_j}$$

and the theoretical value, which amounts to minimizing $$\varepsilon = \left(\sum_j a_j\right) \cdot \sum_j \frac{\pi_j}{a_j} - \left(\sum_j \sqrt{\pi_j}\right)^2$$

are tested.

Use of a Broadcasting Script

The implementation of the broadcasting algorithm is considerably simplified if the mechanism of sampling from the stacks is replaced with a script comprising the list of data blocks to be broadcast cyclically, the broadcasting of general and urgent control messages then taking priority through temporary interruption of the script.

To do this, it is necessary for all the stacks to periodically return to the same position in the course of the algorithm. This is only possible in a simple manner if the number m of each stack is a multiple of $a_1, a_2, \ldots, a_j, \ldots a_k$. If this is not the case, padding messages will be appended to each stack so as to reach the sought-after number.

Naturally, combinations whose lowest common multiple is as small as possible should preferably be adopted since padding leads to a loss of efficiency.

With the exemplary distribution of probabilities of FIG. 4, the values of $\pi_j$ for three and four stacks (K=3,4) would be the following:

| K = 3 | $\pi_j \in \{0.08; 0.18; 0.74\}$ |
| --- | --- |
| K = 4 | $\pi_j \in \{0.04; 0.10; 0.24; 0.62\}$ |

The calculation of the function $\varepsilon$ for these values give the triplet and the quadruplet to be adopted for the compilation of the broadcasting script, i.e.:

| K = 3 | {2; 3; 6} | ppcm = 6 |
| --- | --- | --- |
| K = 4 | {2; 4; 6; 9} | ppcm = 36 |

Common Data Blocks Shared by Several Screens

Certain graphical objects such as images or logos are often present in several screens. One strategy consists in broadcasting only once the data blocks which correspond to them, often of large size.

If for example a block of size $t_c$ is common to two screens broadcast with the frequencies $f_1$ $f_2$ ($f_1 \geq f_2$), this common block is broadcast with the larger frequency $f_1$ thus saving a broadcasting capacity of $f_2 t_c$.

It will however be noted that, except for the most consulted screen with which the common object would be broadcast, this leads to an increase in the access time for the other screens using this data block.

The use of common data blocks is therefore efficient for screens with different broadcasting frequency but it remains penalizing for screens of like frequency if no other measure is taken.

This can however be compensated for through wise use of the structure of the successions of screen pages offered to the users on a given site to cover one or more services to which the user has access.

When he connects up to a site, any user firstly receives the site home page, followed by the site menu which allows him to access the home pages and menus of the various services present on the site.

To avoid increasing the access times due to common blocks, the latter are broadcast at the same time as the graphical objects describing the home page of the relevant service if dealing with (the most likely case) objects linked with a single service, at the same time as the objects of the home page of the site if dealing with objects used by several services.

The terminal will store these objects until the user exits the service in the first case, the site in the other case.

When the terminal has sufficient memory, this generally being the case for pocket computers of the "Palm" or "Windows CE" type, the quality of the service can be appreciably improved with the aid of a cache.

When a user consults a screen, he can, in general with the aid of buttons or sensitive areas, navigate to other screens:
- the screen previously consulted;
- the menu of the current service and of the site;
- the screens which the current screen can access by means of the links associated with actions (buttons, etc).

It is easy to construct a cache for instantaneous access to the screens already consulted. For the last category of screens, the terminal determines, by utilizing the links of the actions, the list of screens which are "contiguous downstream" of the current screen. Next, by virtue of the multitask capabilities of the operating system, the terminal loads these screens while the user is consulting the current screen. Insofar as the consultation time (5 to 10 seconds minimum) is of the same order as the mean time to access the screens, this being the case with services with around 100 screens on a local network, access to the contiguous downstream screens will appear to be almost instantaneous to the user.

The terminal implements a cache purge process in parallel so as to discard the descriptions of screens which no longer belong to the categories hereinabove when the capacity allocated to the cache is exceeded.

Transactional Exchanges

Moreover, the broadcasting server 6 must not feed the access points constituted by the posts 3 at a rate greater than their broadcasting capacity and must allow sufficient time for the traffic engendered by the transactional services, which are manifested as exchanges between the transactional server 7 and the receiver terminals 1.

The access ratio of broadcast services to transactional services is fixed by the administrator.

The service implemented by the transactional server will now be described.

In this service, a certain number of screens and of messages are common to all the users; these screens and messages are transmitted in broadcast mode in the manner described in the previous paragraphs. The corresponding messages are integrated into all the messages broadcast.

A post 3 enters the transactional mode when it detects the transmission by a terminal 1 of a sequence intended for the transactional server 7 (dispatching of an order form, purchase, request, etc.).

This exchange of data is performed in "unicast" mode with the server 7 whose IP address is provided. It may be preceded by an exchange of control messages and in particular the providing by the terminal of its identifier.

The transactional services use the same protocol for describing the screens as the services broadcast and its interactive part for the transactions.

The structure of the transactional servers is linked to the nature of the services provided. The server software provides the programming interfaces required for carrying out the application part of the software. This part can be executed on a remote machine while the transactional part executes on a local machine.

In certain simple cases it will be able to share the same machine as the broadcasting server.

A specific transactional server handles the management of the associated services: updating of the list of users and of their Internet address, collection on the distribution network (DS) of the services actually broadcast, dispatching by Internet of the latest versions of the services to the users with a fixed periodicity.

Numerous applications may be envisaged for the method and the system which have just been described.

The following table summarizes a certain number of possible advantageous exemplary applications:

TABLE A

| Sites | Broadcast services | | | | | | | |
|---|---|---|---|---|---|---|---|---|
| | Home & Guide | Promotions | Specific info | Weather | Road info | Holiday info | Gen. % local info | Stock-market |
| Commercial & Industrial | | | | | | | | |
| Business centers | x | x | x | | | x | x | |
| Hypermarkets | x | x | | | | x | x | |
| Traditional large shops | x | x | | | | x | x | |
| Large enterprises | x | | x | | | | x | x |
| Industrial parks | x | | x | | x | | x | x |
| Transport and tourism | | | | | | | | |
| Railroad stations | x | x | x | x | | x | x | |
| Airports | x | x | x | x | | x | x | x |
| Subway stations | x | | x | | x | x | x | x |
| Highway service stations | x | | | x | x | x | x | x |
| Gas stations | x | | | x | x | x | x | x |
| Yachting harbors | x | | x | x | | x | x | |
| Hotels | x | x | x | x | x | x | x | x |
| Museums | x | | x | | | x | | |
| Services | | | | | | | | |
| Banks | x | x | x | | | x | x | x |
| Post offices | x | x | x | | | x | x | x |
| Social departments (SS, national employment service, etc.) | x | | x | | | | x | |
| Hospitals | x | | x | | | | x | x |
| Universities | x | | x | x | x | x | x | x |
| Libraries | x | | x | | | | x | |

TABLE A-continued

| Shows and miscellaneous events | | | | | | | | |
|---|---|---|---|---|---|---|---|---|
| Conferences and exhibitions | x |  | x | x | x | x | x | x |
| Theme parks | x | x | x | x | x | x | x | x |
| Stadiums | x |  | x | x | x |  |  |  |
| Horse race courses | x |  | x | x |  | x |  |  |

| | Transactional services | | | | | | | |
|---|---|---|---|---|---|---|---|---|
| Sites | Express pur-chases | Holiday bookings | Theatre/ cinema bookings | Targeted games | Purchase of travel tickets | Conf. exhub. registr. grp. entr. trips | Specific trans- actions | Betting & Gaming |
| Commercial & Industrial | | | | | | | | |
| Business centers |  | x | x | | | | | |
| Hypermarkets | x | x | x | | | | | |
| Traditional large shops | x | x | | | | | | |
| Large enterprises | | | | | x | | | |
| Industrial parks | | | | | x | | | |
| Transport and tourism | | | | | | | | |
| Railroad stations | x | x | x | x | | | | |
| Airports | x | x | | x | x | x | | |
| Subway stations | | x | x | | | | | |
| Highway service stations | | x | | | | | | |
| Gas stations | | x | | | | | | |
| Yachting harbors | | x | | | x | | | |
| Hotels | | x | x | x | x | | | |
| Museums | | x | x | | | | | |
| Services | | | | | | | | |
| Banks | | x | x | | x | | x | |
| Post offices | | x | x | | x | | x | |
| Social departments, (SS, national employment service, etc.) | | | x | | | x | | |
| Hospitals | | x | | | x | | | |
| Universities | x | x | | x | x | | | |
| Libraries | | | x | | x | | | |
| Shows and miscellaneous events | | | | | | | | |
| Conferences and exhibitions | x | x | x | x | x | x | | |
| Theme parks | | x | x | x | x | x | | |
| Stadiums | | x | x | x | x | x | x | x |
| Horse race courses | | | | | | | | x |

The invention claimed is:

1. A method for loop broadcasting a plurality of data blocks which correspond to objects or to fragments or aggregates of objects such as alphanumeric messages and/or screen pages and/or graphical objects integrated into screen pages and/or sound sequences, and intended to be restored by restoring means with which users are provided, comprising:
  stacking the data blocks into several stacks, each stack corresponding to a broadcasting priority;
  broadcasting the data blocks in an iterative manner; and
  at each iteration and for each stack, broadcasting a number of data blocks, which is dependent on the priority of broadcasting of said respective stack, at an output of the respective stack and then restacking at an input of the respective stack, characterized in that the data blocks to be broadcast are classed in order of priority of consultation, the list thus constructed is divided into K stacks with a number of substantially equal data blocks and the data blocks and the data blocks of each stack are broadcast with a frequency equal to or nearly equal to $$f_j = \frac{B}{t} \frac{\sqrt{\pi_j}}{\sum_{j=1}^{K} \sqrt{\pi_j}}$$

where j denotes the index of the stack, B the broadcasting capacity, t the size of the stacks and where $$\pi_j = \sum_{i=1}^{M} p_i$$

Pi being the probability of consultation of an object described wholly or partly by the data block i, M being the number of data blocks in a stack.

2. The method as claimed in claim 1, characterized in that information regarding the interest shown by the users in the various objects broadcast is received in real time and in that the numbers of data blocks sampled from a stack are modified and/or a change of data block stack is effected as a function of this information.

3. The method as claimed in claim 1, characterized in that the number of stacks is 3 or 4.

4. The method as claimed in claim 1, characterized in that the data blocks broadcast have a size of less than 400 useful bytes.

5. The method as claimed in claim 1, characterized in that the numbers $a_j$ of data blocks sampled at each iteration are such that they minimize $$\varepsilon = \left(\sum_j a_j\right) \cdot \sum_j \frac{\pi_j}{a_j} - \left(\sum_j \sqrt{\pi_j}\right)^2.$$

6. The method as claimed in claim 5, characterized in that the number M of data blocks in each stack is chosen to be a multiple of each of the numbers $a_j$.

7. The method as claimed in claim 6, characterized in that at least one padding data block is introduced into at least one stack.

8. The method as claimed in claim 5, characterized in that the number $a_j$ is chosen less than or equal to 9.

9. The method as claimed in claim 1, characterized in that objects common to several screens are transmitted once only.

10. The method as claimed in claim 9, characterized in that these objects are transmitted with a home page data block.

11. A system for loop data broadcasting comprising means for the radio broadcasting of data blocks within a given area, a plurality of portable terminals able to receive the data blocks thus radio broadcast, processing means which manage the broadcasting of said data, characterized in that said processing means implement a method according to claim 1.

* * * * *